(12) United States Patent
Kimura et al.

(10) Patent No.: US 6,577,256 B2
(45) Date of Patent: Jun. 10, 2003

(54) IMAGE-CODING APPARATUS AND IMAGE-CODING METHOD, DATA-CODING APPARATUS AND DATA-CODING METHOD, DATA-RECORDING APPARATUS AND DATA-RECORDING MEDIUM

(75) Inventors: Tomohiro Kimura, Tokorozawa (JP); Koki Aizawa, Tokyo-to (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/906,824

(22) Filed: Jul. 18, 2001

(65) Prior Publication Data

US 2002/0037052 A1 Mar. 28, 2002

(30) Foreign Application Priority Data

Jul. 18, 2000 (JP) ........................................ 2000-217979

(51) Int. Cl.[7] ................................................ H03M 7/40
(52) U.S. Cl. ............................ 341/67; 382/232; 341/51
(58) Field of Search .............................. 341/50, 65, 67, 341/51; 382/232

(56) References Cited

U.S. PATENT DOCUMENTS 4,717,956 A * 1/1988 Moorhead et al. .......... 358/135
5,907,361 A * 5/1999 Okada ........................ 348/339
5,991,452 A * 11/1999 Shimizu ..................... 382/248
2001/0010707 A1 * 8/2001 Matsumura et al. ... 375/240.24

* cited by examiner

Primary Examiner—Peguy JeanPierre
(74) Attorney, Agent, or Firm—Sughrue Mion, PLLC

(57) ABSTRACT

The image-coding apparatus is provided with: a motion-prediction-compensation circuit 36, which performs motion-prediction-compensation independently for each frame image in a composite-frame image that is obtained by forming abotuidary between and by connecting the respective frame images that make up a plurality of different moving images; a quantization circuit 32, which performs quantization for each frame image based on the results of motion prediction compensation for each frame image; a variable-length coding circuit 25, which codes each respective moving image by coding each of the frame images based on the quantization results for each frame image; and a control circuit 22, which performs control such that motion prediction compensation, quantization and coding are repeated for a plurality of successive composite-frame images.

19 Claims, 8 Drawing Sheets

FIG. 5A

| NO. OF MACRO BLOCK TO BE PREDICTED | MACRO BLOCK NOS. IN THE SEARCH AREA |
|---|---|
| MB1 | 1~3, 45~47, 89~91 |
| ⋮ | ⋮ |
| MB106 | 16~20, 60~69, 104~108, 148~152, 243~246 |
| ⋮ | ⋮ |
| MB156 | 67~70, 111~114, 155~158, 199~202, 199~202 |
| ⋮ | ⋮ |
| MB1320 | 1230~1232, 1274~1276, 1318~1320 |

| GR | | MBR | | | SA | | | MBR | | | SA' | |
|---|---|---|---|---|---|---|---|---|---|---|---|---|
| 1 | ..... | 16 | 17 | 18 | 19 | 20 | 21 | 22 | 23 | 24 | 25 | 26 | 44 |
| 45 | | 60 | 61 | 62 | 63 | 64 | 65 | 66 | 67 | 68 | 69 | 70 | 88 |
| 89 | | 104 | 105 | 106 | 107 | 108 | 109 | 110 | 111 | 112 | 113 | 114 | 132 |
| 133 | | 148 | 149 | 150 | 151 | 152 | 153 | 154 | 155 | 156 | 157 | 158 | 176 |
| 177 | | 192 | 193 | 194 | 195 | 196 | 197 | 198 | 199 | 200 | 201 | 202 | 220 |
| 221 | | 236 | 237 | 238 | 239 | 240 | 241 | 242 | 243 | 244 | 245 | 246 | |

1320

GRA   L   GRB

IMAGE-CODING APPARATUS AND IMAGE-CODING METHOD, DATA-CODING APPARATUS AND DATA-CODING METHOD, DATA-RECORDING APPARATUS AND DATA-RECORDING MEDIUM

BACKGROUND OF THE INVENTION

1. Field of the Invention

The present invention relates to an image-coding apparatus and image-coding method, data-coding apparatus and data-coding method, data-recording apparatus and data-recording medium, and in particular, the present invention relates to an image-coding apparatus and image-coding method for coding moving images, a data-coding apparatus and data coding method for coding input data that contains moving images and corresponding sound data, and a data-recording apparatus that includes the data-coding apparatus and data-recording medium on which an image-coding program or data-coding program is recorded.

2. Description of the Related Art

Conventionally, the contents of a program obtained from a broadcast signal are recorded on a recording medium such as videotape.

However, up until now, two programs that were broadcast during the same time period were not recorded simultaneously.

Moreover, when using conventional recording equipment for recording two different programs at the same time, it was necessary to use two systems for coding the moving images. This led to the problem of the need for high-cost recording equipment with complicated construction, as well as the need for employing a special recording method, which in turned required that a special reproduction method be used for reproduction.

SUMMARY OF THE INVENTION

In view of the problems described above, it is the object of the present invention to provide an image-coding apparatus and image-coding method, a data-coding apparatus and data-coding method, and a data-recording apparatus and data-recording medium, which contains a recorded image-coding program or data-coding program, that will make it possible to simply record two or more programs simultaneously, as well as use a conventional reproduction method for reproducing the recorded programs.

The above object of the present invention can be achieved by an image coding apparatus of the present invention, which codes moving images by coding a composite frame image that is obtained by fanning a boundary between and by connecting the respective frame images of a plurality of different moving images. The image coding apparatus is provided with: a motion-prediction-compensation device for independently performing motion prediction compensation for each of said frame images in said composite frame image; a quantization device for performing quantization for each of said frame images based on the results of said motion prediction compensation that is performed for each said frame image; a coding device for coding said moving images by coding each said frame image based on the results of said quantization that is performed for each said frame image; and a control device for controlling said motion-prediction-compensation device, quantization device and coding device such that said motion prediction compensation, quantization and coding are performed for a plurality of continuous composite-frame images by said motion-prediction-compensation device, quantization device and coding device, respectively.

According to the present invention, frame images, having a plurality of moving images, are collected together as a composite frame image, and the coding process is executed for each individual frame, and thus it is possible to code a plurality of moving images simultaneously with a single coding apparatus. In addition, since each frame image in one composite frame image is coded individually, it is possible to decode the coded moving image using a conventional decoding method.

In one aspect of the present invention, the motion-prediction-compensation device executes said motion prediction compensation by setting a search area for said motion prediction compensation within only the range of said frame images contained in said composite frame image, and detecting the motion vector.

According to this aspect in the motion-prediction-compensation process, movement vectors are detected by setting a search area that is within only the range of frame images of the composite frame image, so it is possible to code a plurality of moving images at the same time using the same coding method as used for a non-composite moving image.

In another aspect of the present invention, the quantization device independently performs said quantization for each of said frame image in said composite frame image.

According to this aspect, the quantization process is performed independently for each frame image, so it is possible to perform quantization accurately for each frame image.

In further aspect of the present invention, the image-coding apparatus is further provided with a discrete cosine transform device for performing discrete cosine transform of each said frame image based on the results of said motion prediction compensation that is performed on each said frame image, wherein said quantization device performs said quantization for each of said frame image of which discrete cosine transform is performed.

According to this aspect, discrete-cosine-transform processing is performed for each frame image, so it is possible to code each moving image with a high coding rate.

In further aspect of the present invention, the motion prediction compensation, quantization process and coding process are executed according to Moving Picture Experts Group (MPEG) format.

According to this aspect, it is possible to compress and code a plurality of moving images simultaneously.

The above object of the present invention can be achieved by a data-coding apparatus of the present invention, which includes an image-coding apparatus for coding moving images by coding a composite frame image that is obtained by forming a boundary between and by connecting the respective frame images of a plurality of different moving images. The image-coding apparatus is provided with: a motion-prediction-compensation device for independently performing motion prediction compensation for each of said frame images in said composite frame image; a quantization device for performing quantization for each of said frame images based on the results of said motion prediction compensation that is performed for each said frame image; a coding device for coding said moving images by coding each said frame image based on the results of said quantization that is performed for each said frame image; and a control device for controlling said motion-prediction-compensation device, quantization device and coding device such that said motion prediction compensation, quantization and coding are performed for a plurality of continuous composite-frame images by said motion-prediction-compensation device, quantization device and coding device, respectively. The data-coding apparatus is provided with: a separation device for separating moving images and sound data from a plurality of input data that contain said moving images and said sound data that correspond to said moving images; a first composite-image device for reducing the amount of data in said frame images of said separated moving images, and for generating said composite frame image to output that image to said image-coding apparatus; a sound-coding device for coding said separated sound data simultaneously with coding of the corresponding said moving images and for generating coded sound data; and a second composite-image device for combining corresponding said coded moving images and said coded sound data and for generating a plurality of said coded input data.

According to the present invention, the sound data is coded in parallel with coding of the moving images, after which, they are combined, and so it is possible to code a plurality of input data simultaneously. Therefore, it is possible to code a plurality of moving images simultaneously with simple construction, and when decoding the coded moving images it is possible to use a conventional decoding method as is.

The above object of the present invention can be achieved by a data-recording apparatus of the present invention, which includes an image-coding apparatus for coding moving images by coding a composite frame image that is obtained by forming a boundary between and by connecting the respective frame images of a plurality of different moving images. The data-recording apparatus is provided with: a motion-prediction-compensation device for independently performing motion prediction compensation for each of said frame images in said composite frame image; a quantization device for performing quantization for each of said frame images based on the results of said motion prediction compensation that is performed for each said frame image; a coding device for coding said moving images by coding each said frame image based on the results of said quantization that is performed for each said frame image; a control device for controlling said motion-prediction-compensation devices quantization device and coding device such that said motion prediction compensation, quantization and coding are performed for a plurality of continuous composite-frame images by said motion-prediction-compensation device, quantization device and coding device, respectively; a separation device for separating moving images and sound data from a plurality of input data that contain said moving images and said sound data that correspond to said moving images; a first composite-image device for reducing the amount of data in said frame images of said separated moving images, and for generating said composite frame image to output that image to said image-coding apparatus; a sound-coding device for coding said separated sound data simultaneously with coding of the corresponding said moving images and for generating coded sound data; a second composite-image device for combining corresponding said coded moving images and said coded sound data and for generating a plurality of said coded input data; and a recording device for separately recording said coded input data on a recording medium.

According to the present invention, it is possible to code and record a plurality of input data simultaneously. Therefore, it is possible to code and record input data from a plurality of sources simultaneously with simple construction, and when decoding and reproducing the recorded input data, it is possible to use conventional decoding and reproduction methods as are.

The above object of the present invention can be achieved by an image-coding method of the present invention for coding said moving images by coding a composite frame image that is obtained by forming a boundary between and by connecting the respective frame images of a plurality of different moving images. The image-coding method is provided with the processes of: independently performing motion prediction compensation for said frame images in said composite frame image; performing quantization for each of said frame images based on the results of said motion-prediction-compensation that is performed for each of said frame images; coding said moving images by coding each of said frame images based on the results of said quantization that is performed for each of said frame images; and repeating said motion prediction compensation, quantization and coding for a plurality of continuous said composite frame images.

According to the present invention, the frame images, which comprise a plurality of moving images, are combined into a composite frame image, and coding is performed for each image individually, so it is possible to code a plurality of moving images simultaneously with one coding apparatus. Moreover, since the frame images within a single composite frame image are coded individually, it is possible to decode the coded moving images using a conventional decoding method as is.

In one aspect of the present invention, the process of independently performing motion prediction compensation executes said motion-prediction-compensation by setting a search area for said motion-prediction-compensation within only the range of said frame images that are included in one said composite frame image and detecting the motion vectors.

According to this aspect, in the movement-prediction-compensation process, movement vectors are detected by setting a search area that is within only the range of frame images of the composite frame image, so it is possible to code a plurality of moving images at the same time using the same coding method as used for a non-composite moving image.

In another aspect of the present invention, the process of performing quantization independently performs quantization for each of said frame images in said composite frame image.

According to this aspect, the quantization process is performed independently for each frame image, so it is possible to perform quantization accurately for each frame image.

In further aspect of the present invention, the image-coding method is further provided with: the process of performing discrete cosine transform for each of said frame images based on the results of said movement-prediction-compensation that is performed for each of said frame images, and wherein said process for performing quantization executes quantization for each of said frame images after discrete cosine transformation.

According to this aspect, discrete-cosine-transform processing is performed for each frame image, so it is possible to code each moving image with a high coding rate.

In further aspect of the present invention, the motion prediction compensation, quantization and coding are executed based on MPEG format.

According to this aspect, it is possible to compress and code a plurality of moving images simultaneously.

The above object of the present invention can be achieved by a data-coding method of the present invention that includes the image-coding method for coding said moving images by coding a composite frame image that is obtained by forming a boundary between and by connecting the respective frame images of a plurality of different moving images. The image-coding method is provided wit the processes of: independently performing motion prediction compensation for said frame images in said composite frame image; performing quantization for each of said frame images based on the results of said motion-prediction-compensation that is performed for each of said frame images; and coding said moving images by coding each of said frame images based on the results of said quantization that is performed for each of said frame images; and repeating said motion prediction compensation, quantization and coding for a plurality of continuous said composite frame images. The data-coding method is provided with the processes of: separating moving images and sound data from a plurality of input data that includes said moving images and corresponding sound data; generating said composite-frame image to execute said image-coding method after reducing the amount of data in said frame images containing said separated moving images; coding each of separated said sound data simultaneously with coding of corresponding said moving images to generate coded sound data; and combining corresponding said coded moving images and said coded sound data to generate a plurality of said coded input data.

According to the present invention, the sound data is coded in parallel with coding of the moving images, after which, they are combined, and so it is possible to code a plurality of input data simultaneously. Therefore, it is possible to code input data from a plurality of sources simultaneously with simple construction, and when decoding the coded input data, it is possible to use a conventional decoding method as is.

The above object of the present invention can be achieved by a data-recording medium of the present invention on which an image-coding program is recorded so that it is readable by a computer, which is included in an image-coding apparatus that codes said moving images by coding a composite-frame image that is obtained by forming a boundary between and by connecting the respective frame images of a plurality of different moving images. The image-coding program causes the computer to function as: a motion-prediction-compensation device for independently performing a motion prediction compensation for each of said frame images in said composite frame image; a quantization device for performing quantization for each of said frame images based on the results of said motion prediction compensation that was performed for each said frame image; a coding device for coding said moving images by coding each said frame image based on the results of said quantization that was performed for each said frame image; and a control device for controlling said motion-prediction-compensation device, quantization device and coding device such that said motion prediction compensation, quantization and coding are performed for a plurality of continuous composite-frame images by said motion-prediction-compensation device, quantization device and coding device, respectively.

According to the present invention, the computer functions to combine a plurality of moving images of a frame image into a composite frame image and executes the coding process for each individually, so it is possible to code a plurality of moving images simultaneously with one coding apparatus. Moreover, the computer functions to code the frame images in one composite frame image individually, so it is possible to decode the coded moving images using a conventional decoding method as is.

In one aspect of the present invention, the motion-prediction-compensation device performs said motion prediction compensation by setting the search area for the motion-prediction-compensation within only the range of said frame images that are included in one said composite-frame image and detecting the motion vectors.

According to this aspect, the computer functions to detect movement vectors in the movement-prediction-compensation process by setting a search area that is within only the range of frame images of the composite frame image, so it is possible to code a plurality of moving images at the same time using the same coding method as used for a non-composite moving image.

In another aspect of the present invention, the quantization device performs quantization independently for each of said frame images in said composite-frame image.

According to this aspect, the computer performs quantization independently for each frame image, so it is possible to quantize each frame image accurately.

In further aspect of the present invention, the image-coding program further causes the computer to function as: a discrete cosine transform device for performing discrete cosine transformation of each of said frame images based on the results of said motion-prediction-compensation that is performed for each of said frame images, wherein said quantization device performs quantization for each of said frame images after discrete cosine transformation.

According to this aspect, the computer performs discrete cosine transform for each frame image, so it is possible to code each moving image with a high coding rate.

In further aspect of the present invention, the motion-prediction-compensation, quantization and coding are executed based on MPEG format.

According to this aspect, it is possible to compress and code a plurality of moving images simultaneously.

The above object of the present invention can be achieved by a data-recording medium of the present invention on which a coding program is recorded so that it is readable by a computer, which is included in a data-coding apparatus that includes an image-coding apparatus that codes said moving images by coding a composite-frame image that is obtained by forming a boundary between and by connecting the respective frame images of a plurality of different moving images. The coding program that includes an image-coding program causing the computer to function as said image-coding apparatus. The image-coding apparatus is provided with: a motion-prediction-compensation device for independently performing a motion prediction compensation for each of said frame images in said composite frame image; a quantization device for performing quantization for each of said frame images based on the results of said motion prediction compensation that was performed for each said frame image; a coding device for coding said moving images by coding each said frame image based on the results of said quantization that was performed for each said frame image; and a control device for controlling said motion-prediction-compensation device, quantization device and coding device such that said motion prediction compensation, quantization and coding are performed for a plurality of continuous composite-frame images by said motion-prediction-compensation device, quantization device and coding device, respectively. In addition, the coding program further causes the computer to function as: a separation device for separating moving images and sound data from a plurality of input data that includes said moving images and corresponding sound data; a first composite-image device for reducing the amount of data in said frame images containing said separated moving images, and for generating said composite-frame image to output that image to said computer functioning as said image-coding apparatus; a sound-coding device for coding each of separated said sound data simultaneously with coding of corresponding said moving images, and for generating coded sound data; and a second composite-image device for combining corresponding said coded moving images and said coded sound data, and for generating a plurality of said coded input data.

According to the present invention, the computer codes sound data in parallel with the coding of moving images, and then combines them, so it is possible to code a plurality of input data simultaneously. Therefore, it is possible to code input data from a plurality of sources simultaneously with simple construction, and when decoding the coded input data, it is possible to use a conventional decoding method as is.

BRIEF DESCRIPTION OF THE DRAWINGS

FIGS. 5A and 5B are diagrams showing a second example (II) of the operation of the movement-prediction-compensation circuit;

DESCRIPTION OF THE PREFERRED EMBODIMENTS

The preferred embodiments of the present invention will be described with reference to the drawings.

The embodiment described below, to which the present invention is applied, is a data recording apparatus that is capable of coding input data for both images and sound from two sources simultaneously, and recording that data on a recording medium such as a writable optical disc or hard disc, and codes the input data from a source and records it on a recording medium using a conventional method.

Here the two sources of input data, for example, are two broadcast programs that are broadcast during the same time period and are to be recorded at the same time.

Figure 1:
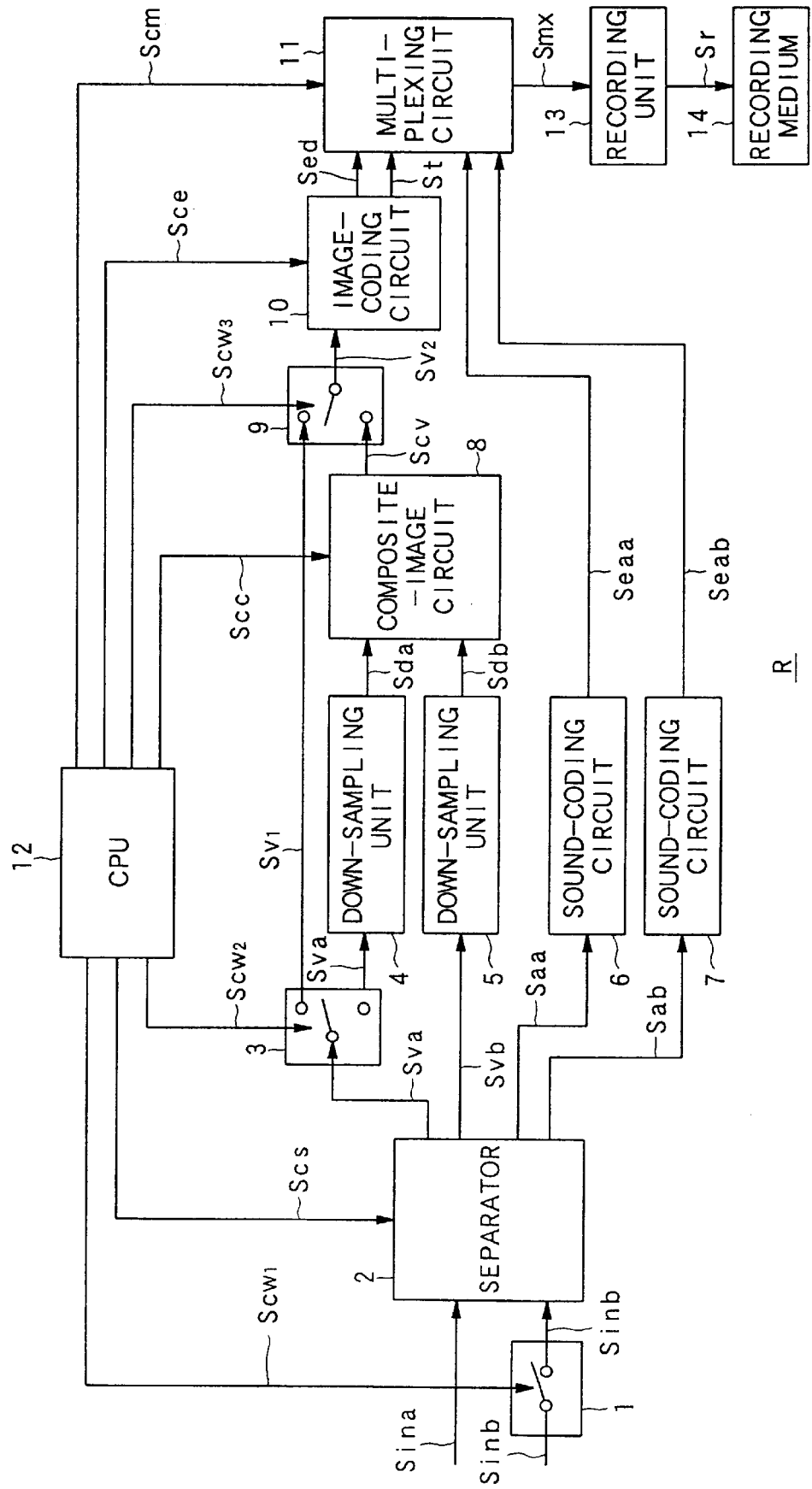
FIG. 1 is a block diagram showing the basic construction of an embodiment of a data recording apparatus.

First, FIG. 1 will be used to explain the basic construction and operation of the data recording apparatus of this embodiment. FIG. 1 is a block diagram showing the basic construction of the data recording apparatus.

As shown in FIG. 1, the data recording apparatus R of this embodiment comprises: switches 1, 3 and 9, a separating circuit 2 as a separation device, down sampling units 4 and 5, sound coding circuits 6 and 7 as sound-coding device, a composite-image-formation circuit 8 as a first way of forming composite image data, a coding device 10, a multiplexing circuit 11 as a second composite-image device, a CPU 12 and a recording unit 13 as a recording device.

Next, the operation will be explained.

First, the operation of using the data recording apparatus R of this embodiment to code data information from only one source and record it on a recording medium 14 will be explained.

First, when coding and recording input data from only one source, the switch 1 is turned OFF according to a control signal Scw1 from the CPU 12, and switches 3 and 9 are switched to the up position in FIG. 1 according to respective control signals Scw2 or Scw3 from the CPU. When this happens, the CPU 12 is instructed by a control unit (not shown in the figure) to code and record data from only one source, and outputs control signals Scw1 to Scw3 for the appropriate operation.

In this case, the down sampling units 4 and 5, composite-image-formation circuit 8 and sound coding circuit 7 do not operate.

The aforementioned input data from one source that is to be recorded on the recording medium 14 is input to the separating circuit 2 as input data Sina.

Next, the separating circuit 2 separates the input data Sina into image data Sva, which contains only images, and sound data Saa, which contains only speech and other sound (simply called sound below), based on a control signal from the CPU 12, and outputs the separated data to switch 3 and the sound coding circuit 6, respectively.

Here, the switches 3 and 9, which are switched to the up position in FIG. 1, output the image data Sva as is to the image coding circuit 10 as switch signals Sv1 and Sv2.

Also, the image coding circuit 10 compresses and codes the image data Sva of the switch signal Sv2 according to a control signal Sce from the CPU using the well known MPEG format, to create coded image data Sed and outputs it to the multiplexing circuit 11.

On the other hand, the sound coding circuit 6 codes the input sound data Saa using the well know MPEG format, to create coded sound data Seaa and outputs it to the multiplexing circuit 11.

Then according to a control signal Scm from the CPU 12, the multiplexing circuit 11 performs multiplexing for each image and sound that corresponds to the coded image data Sed and coded sound data Seaa to create multiplexed data Smx, and outputs that data to the recording unit 13.

The recording unit 13 then performs the preset recording process for the multiplex data Smx and creates recording data Sr and records that recording data Sr on the recording medium 14.

When the recording process performed by the recording unit 13 is for a recording medium 14 that is a writable optical disc, first the recording unit 13 performs a waveform shaping process for the multiplexed data Smx and generates a strength varying optical beam that corresponds to the changes in the multiplexed data Smx, then records that multiplexed data Smx on the recording medium 14.

On the other hand, when the recoding medium 14 is a hard disc, the recording unit 13 records the created recording data Sr directly as is on the recording medium 14.

Next, FIG. 1 will be used to explain the operation of this embodiment of the invention when recording input data from two sources simultaneously.

First, in the case of coding and recording input data from two sources, the switch 1 is turned ON according to a control signal Scw1 from the CPU 12, and the switches 3 and 9 are switched to the down position in FIG. 1 by control signals Scw2 and Scw3 from the CPU 12, respectively. The CPU 12 is instructed by a control unit (not shown in the figure) to code and record input data from two sources, and outputs control signals Scw1 to Scw3 for the appropriate operation, similar to the case described above.

First, the input data from one of the two sources to be recorded on the recording medium 14, is input to the separating circuit 2 as input data Sina, and the input data from the other source is input to the separating circuit 2 as input data Sinb by way of the switch 1.

Then, based on a control signal Scs from the CPU 12, the separating circuit 2 synchronizes frames between the input data Sina and input data Sinb. That is, it matches the input timing for the down-sampling unit 4 for one frame image of the image data Sva (to be described later) with the input timing for the down-sampling unit 5 for one frame image of the image data Svb (to be described later). Then separates the input data Sina into image data Sva, which contains only images, and sound data Saa, which contains only sound, and outputs them to the down-sampling unit 4 (by way of switch 3) and the sound-coding circuit 6, respectively, and also separates the input data Sinb into image data Svb, which contains only images, and sound data Sab, which contains only sound, and outputs them to the down-sampling unit 5 and sound-coding circuit 7, respectively.

Then, the down-sampling unit 4 thins out only the amount of data for the horizontal direction of the frame images contained in the image data Sva to half the amount and creates thinned-out image data Sda, and then outputs the data to the composite-image-formation circuit 8.

At the same time, the down-sampling circuit 5 thins out only the amount of data for the horizontal direction of the frame images contained in the image data Svb to half the amount and creates thinned-out image data Sdb, and then outputs the data to the composite-image-formation circuit 8.

In this way, synchronization is obtained between frames of the thinned-out image data Sda and thinned-out image data Sdb.

Then, according to a control signal Scc from the CPU 12, the composite-image-formation circuit 8 connects one frame image from the thinned-out image data Sda and a corresponding frame image from the thinned-out image data Sdb side-by-side in the horizontal direction, to create composite image data Scv that comprises a composite frame image having the same amount of data as one frame image of the original image data Sva or image data Svb, and then outputs the data as a switch signal Sv2 to the image-coding circuit 10 via the switch 9, which is switched to the down position in FIG. 1.

Here, based on a control signal Sce from the CPU 12, the image-coding circuit 10 compresses and codes the composite image data Scv as switch signal Sv2, in compliance with the MPEG format, described later, to create coded image data Sed, then outputs the data to the multiplexing circuit 11. Then, also the image-coding circuit 10 creates a timing signal St in order to match the timing at which the portion of the composite image data Scv that corresponds to the image data Sva is output from the image-coding circuit 10 as coded image data Sed, or the timing at which the portion of the composite image data Scv that corresponds to the image data Svb is output from the image-coding circuit 10 as coded image data Sed, with the timing at which the coded sound data Seaa or coded sound data Seab, to be described later, is output to the multiplexing circuit 11, and similarly outputs the data to the multiplexing circuit 11.

On the other hand, the sound-coding circuit 6 codes the input sound data Saa using MPEG format or the like to create coded sound data Seaa, and outputs the data to the multiplexing circuit 11.

Furthermore, the sound-coding circuit 7 codes the input sound data Sab using MPEG format or the like to create coded sound data Seab, and outputs the data to the multiplexing circuit 11.

Then, according to a control signal Scm from the CPU 12 and the aforementioned timing signal St, the multiplexing circuit 11 performs multiplexing for the each image and sound corresponding to the image data Sva contained in the coded image data Sed, and corresponding coded sound data Seaa, to create multiplexed data Smx, and then outputs the data to the recording unit 13. In addition, the multiplexing circuit 11 performs multiplexing for each image and sound corresponding to the image data Svb contained in the coded image data Sed, and corresponding coded sound data Seab, to create multiplexed data Smx, and then outputs the data to the recording unit 13.

The recording unit 13, then performs a preset recording process for the multiplexed data Smx to create recording data Sr, and then records the recording data Sr on a recording medium 14.

Next, FIG. 2 thru FIG. 7 will be used to explain the construction and operation of the image-coding circuit 10 when coding input data Sina and Sinb.

Figure 2:
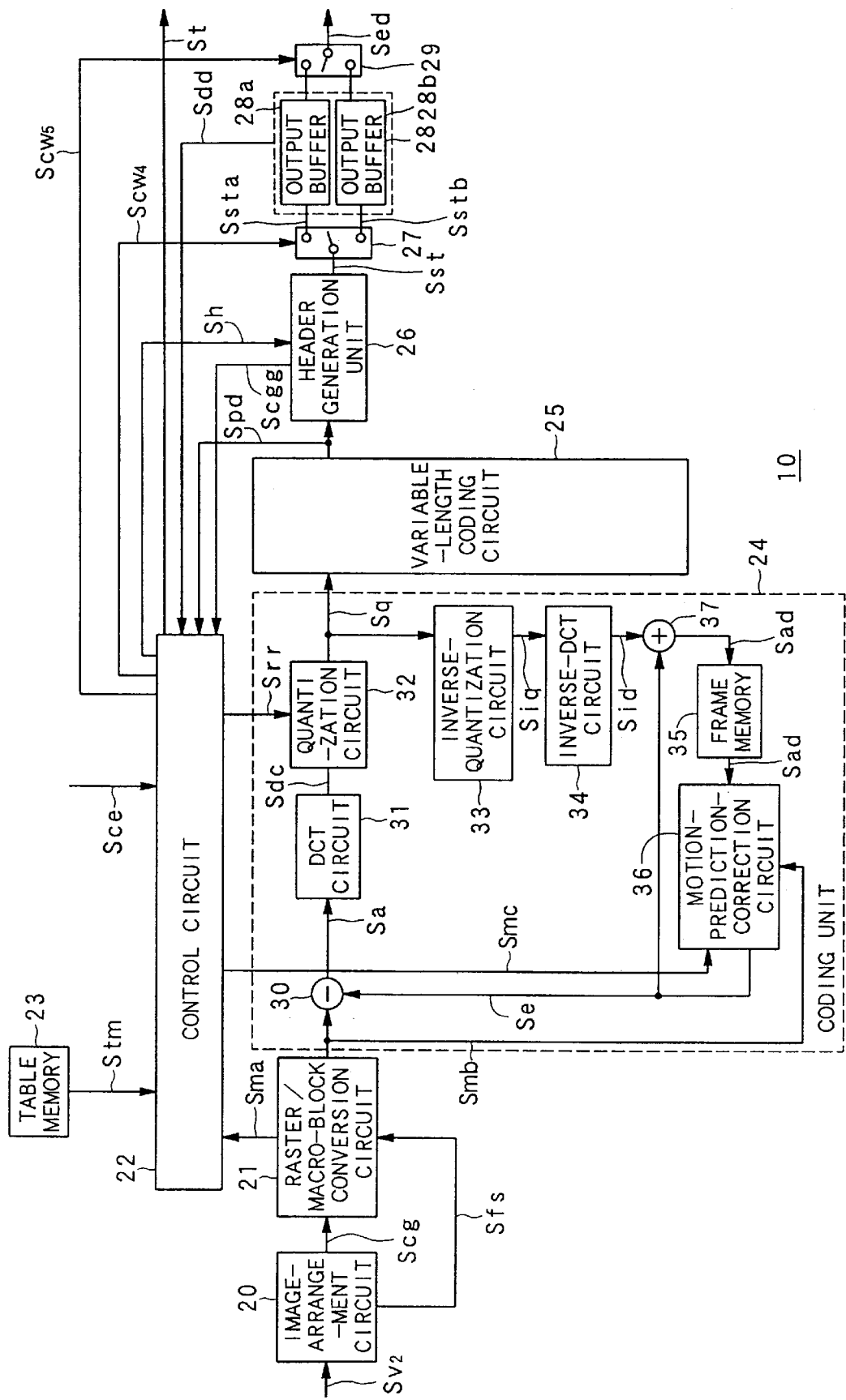
FIG. 2 is a block diagram showing the basic construction of an image coding apparatus.
Figure 3:
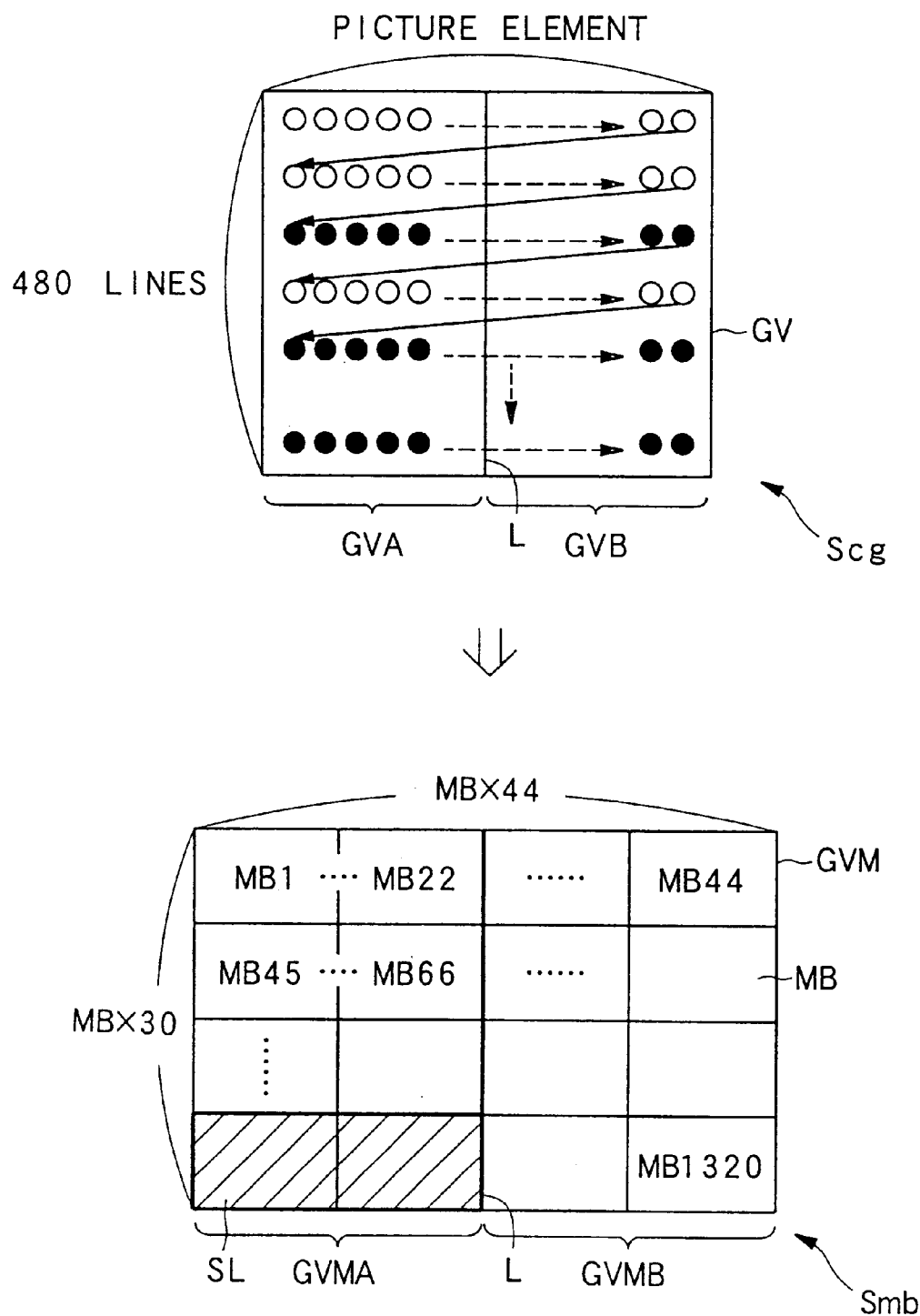
FIG. 3 is a diagram showing the operation of a raster/macro-block conversion circuit.
Figure 6:
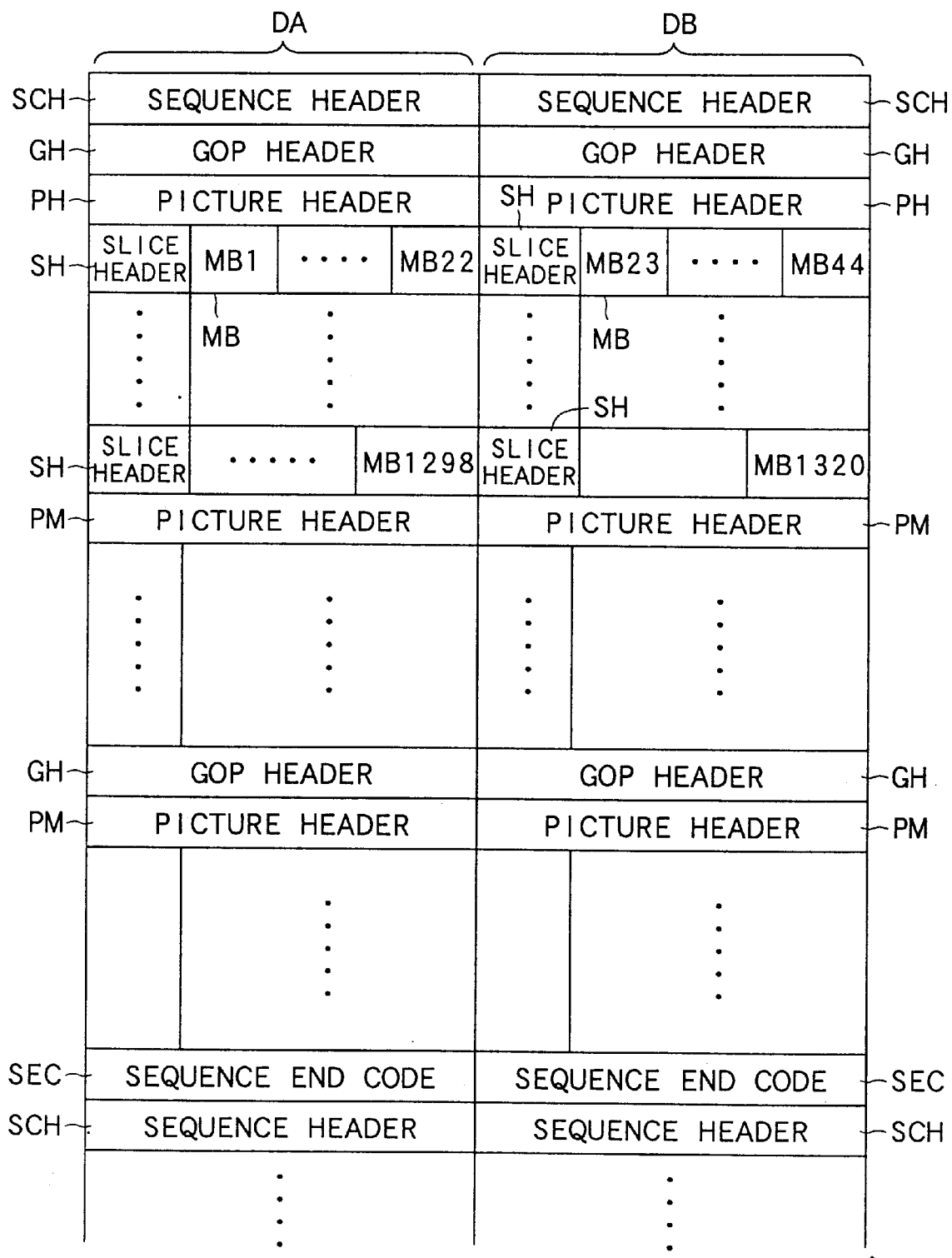
FIG. 6 is a diagram showing the construction of a header-generation memory.
Figure 7:
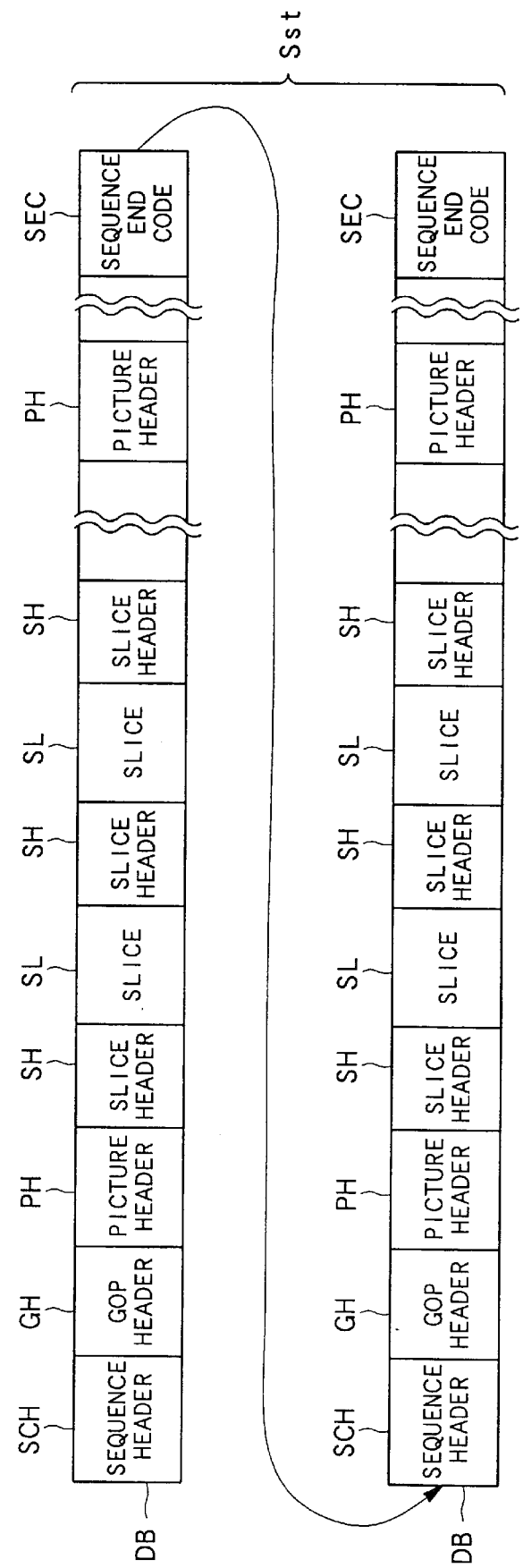
FIG. 7 is a diagram showing the data structure after a header has been added.

FIG. 2 is a block diagram showing the construction of the image-coding circuit 10, FIG. 3 is a diagram showing the operation of a raster/macro-block conversion circuit, FIG. 4 and FIG. 5 show the operation of a movement-prediction-compensation circuit, and FIG. 6 and FIG. 7 show the operation of a header-generation circuit.

As shown in FIG. 2, the image-coding circuit 10 comprises an image-arrangement circuit 20, a raster/macro-block conversion circuit 21, a control circuit 22 as a control device, a table memory 23, a coding circuit 24, a variable-length coding circuit 25 as a coding device, a header-generation circuit 26, switches 27 and 27, and a buffer unit 28 having output buffers 28a, 28b.

Moreover, the coding circuit 24 comprises a subtracter 30, a discrete cosine transform (DCT) circuit 31, a quantization circuit 32 as a quantization device, a inverse-quantization circuit 33, a inverse DCT circuit 34, a frame memory 35, a movement-prediction-compensation circuit 36 as a motion-prediction-compensation device, and an adder 37.

Next, the operation will be explained.

First, the image-arrangement circuit 20 rearranges in frame units (or in the lower-order picture units), the order of each of the frame images contained in the composite image data Scv, or switch signal Sv2, into the order executed by the coding process to be described later, to create a rearranged image signal Scg that includes the rearranged frame images, and then outputs the signal to the raster/macro-block conversion circuit 21.

In the arrangement process, the frame images, which will be the so-called I pictures (Intra-Pictures) in the MPEG format, and the frame images, which will be the so-called P pictures (Predictive-Pictures), are moved and rearranged so they are before the frame images, which will be the so-called B pictures (Bi-directionally Predictive-Pictures).

At the same time as this, the image-arrangement circuit 20 creates a frame-synchronization signal Sfs that shows the output timing from the image-arrangement circuit 20 of each of the rearranged frame images, and outputs the signal to the raster/macro-block conversion circuit 21.

Next, according to the frame-synchronization signal Sfs, the raster/macro-block conversion circuit 21 temporarily stores the picture-element data (brightness data, color data, etc.) for each frame input in the horizontal scanning order (raster order) as the rearranged-image data Scg, as shown in FIG. 3, and then creates macro-blocks MB, as shown in FIG. 3, from the picture-element data, and outputs macro-block signals Smb to the coding circuit 24 in the order of the created macro-blocks MB.

Then, as shown in FIG. 3, the frame images GV that are input as rearranged-image signals Scg are input in horizontal scanning order with the images GVA that correspond to the image data Sva and the images GVB that correspond to the image data Svb connected on the left and right in the horizontal direction along a boundary L. The raster/macro-block conversion circuit 21 uses the picture-element data for adjoining 16 picture elements ×16 picture elements to form a single macro-block MB. Moreover, of the frame image GVM contained in the macro-block signal Smb, the 22 horizontal ×30 vertical macro blocks MB on the left side of the boundary L become the image GVMA that corresponds to the image data Sva, and the 22 horizontal ×30 vertical macro blocks MB on the right side become the image GVMB that corresponds to the image data Svb. In other words, a single frame image GVM contains 1320 macro blocks MB.

Here, as shown by the section with diagonal lines at the bottom of FIG. 3, a slice SL, or basic unit in the MPEG format, comprises 22 macro blocks in the horizontal direction of either the image GVMA or GVMB.

At the same time as this, the raster/macro-block conversion circuit 21 creates number data Sma that gives a number for each macro block MB that was created (refer to FIG. 3), and outputs the data to the control circuit 22.

Next, the macro-block signals Smb that are input to the coding circuit 24 are output to the subtracter 30 and motion-prediction-compensation circuit 36.

When the macro-block signals Smb are output to the subtracter 30, a compensation signal Se output from the motion-prediction-compensation circuit 36, to be described later, is subtracted from the macro-block signals Smb, arid output to the DCT circuit 31 as a subtraction signal Sa.

Next, the DCT circuit 31 performs DCT to compress the subtraction signal Sa, or in other words, transforms the spatial coordinate component of each of the macro blocks MB shown at the bottom of FIG. 3 to a frequency component, and performs this transformation process in the order that the macro blocks MB input as macro-block signals Smb were input to create a transform signal Sdc that contains the macro blocks that were transformed to a frequency component, and then outputs the signal to the quantization circuit 32.

Here, the quantization circuit 32 performs quantization of the transform signal Sdc at a processing rate that corresponds to the quantization-scale code that is given by the rate signal Srr, to be described later, that is sent from the control circuit 22, and creates a quantized signal Sq and outputs the signal to the variable-length coding circuit 25 and inverse-quantization circuit 33.

The quantization process that is performed by the quantization circuit 33 truncates the bits of the picture-element data included in each macro block MB, and compresses the amount of data.

The processing rate is set by the control circuit 22 to prevent an overflow in the output buffers 28a and 28b in the buffer unit 28, and to prevent overflow or underflow in the reproduction buffer that is used when reproducing the data that are recorded on the recording medium 14.

Furthermore, in this embodiment, in the step of outputting data to the buffer unit 28, the image data that corresponds to image data Sva (image data DA described below) and the image data that corresponds to the image data Svb (image data DB described below) are output separately so, quantization by the quantization circuit 32 is executed separately and independently for the image data that corresponds to the image data Sva and the image data that corresponds to the image data Svb in the transform signal Sdc.

Therefore, according to a storage-amount signal Sdd, described later, output from the buffer unit 28, the control circuit 22 references the number of the macro block that is currently being quantized (input from the raster/macro block conversion circuit 21 as number data Sma), and from this number determines whether there is macro block MB that contains image data corresponding to the image data Sva, or whether there is macro block MB that contains image data corresponding to the image data Svb, and executes control for respective processing rate simultaneously and independently while changing the object for the control (with the slice SL as the basic unit).

Next, the inverse-quantization circuit 33 performs inverse quantization for the quantized signal Sq to create an inverse-quantized signal Siq, and outputs the signal to the inverse DCT circuit 34.

The inverse DCT circuit 34 performs inverse DCT (inverse discrete cosine transform) for the inverse-quantized signal Siq, and outputs the result to the adder 37 as an inverse-transform signal Sid.

Through the operation of the inverse-quantization circuit 33 and inverse DCR circuit 34, the reproduction process for creating the previous frame image that is used in the motion-prediction-compensation process is performed for the quantization signal Sq that is described later.

Next, the reproduced inverse-transform signal Sid and the compensation signal Se, described later, are added together by the adder 37 to create the previous frame image, and this previous frame image is saved as the previous frame signal Sad in the frame memory 35 for the time corresponding to the input period of one frame image, and then it is output to the motion-prediction-compensation circuit 36.

Then, based on a control signal Sine from the control circuit 22, the motion-prediction-compensation circuit 36 detects the motion vectors in the MPEG format for each of the macro blocks MB in the macro-block signal Smb and both image data Sva or Svb. Also, the motion-prediction-compensation circuit 36 uses the motion vectors to perform the motion-prediction-compensation process, and creates a compensation signal Se that contains corrected frame images, and outputs the signal to the subtracter 30 and adder 37.

In this embodiment, detection of the motion vectors is performed independently for the frame images that correspond to the image data Sva and the frame images that correspond to the image data Svb.

The search area used in detection of the motion vectors is set such that it does not cross the boundary line between the images that correspond to the image data Sva and the image data Svb in one previous frame image. The search area is the detection range when detecting the macro block in the previous frame image that corresponds to the macro block to be predicted in the current frame image that is input as the macro block signal Smb. The macro block to be predicted in the current frame image is a macro block MB that is the object of motion-vector detection. The macro block in the previous frame image corresponding to the macro block MB contains the image structure of the macro block MB. The search area is normally the area comprising a previously set specified number of macro blocks MB where one macro block MB in a single frame image is the center.

Figure 4A:
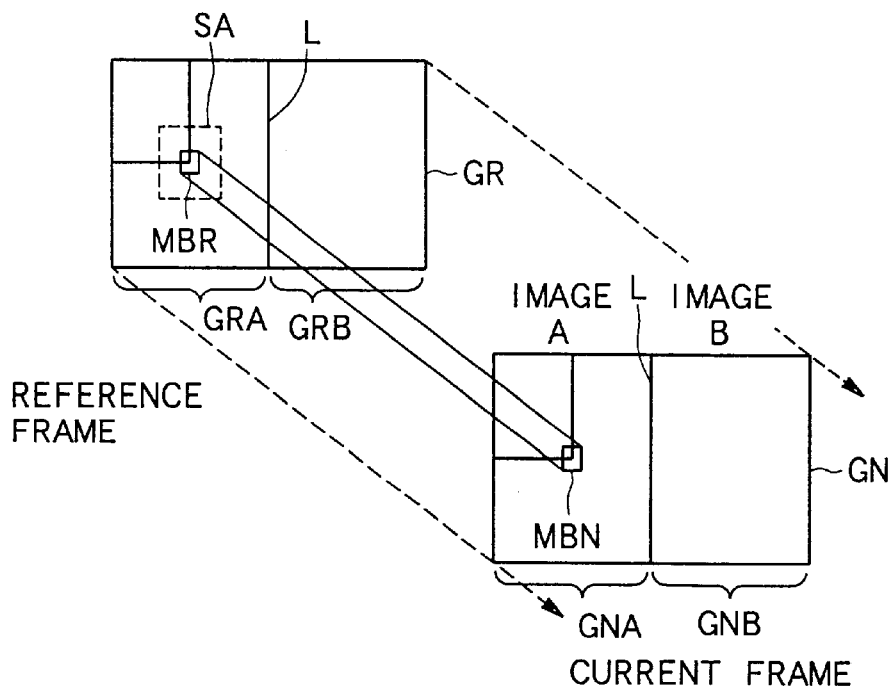
FIG. 4A is a diagram showing a first example (I) of the operation of the movement-prediction-compensation circuit for when the search area and boundary line are separated.

In more detail, as shown in FIG. 4a, when the boundary line L between the image GRA and the image GRB in one previous frame image GR and the search area SA at that time are separated, the width of the search area SA is set as the area which includes the specified number of macro blocks MB where a macro block MBR is in the center. The macro block MBR is in a position in the previous frame image GR that is identical to the position of the macro block MBN to be predicted in the current frame image GN. Th image GRA corresponds to the image data Sva, and the image GRB corresponds to the image data Svb. Naturally, when the macro block MBN to be predicted is in the area of image GNA, the macro block MBR is in the area of image GNA, and when the macro block MBN to be predicted is in the area of image GNB, the macro block MBR is in the area of image GNB.

Figure 4B:
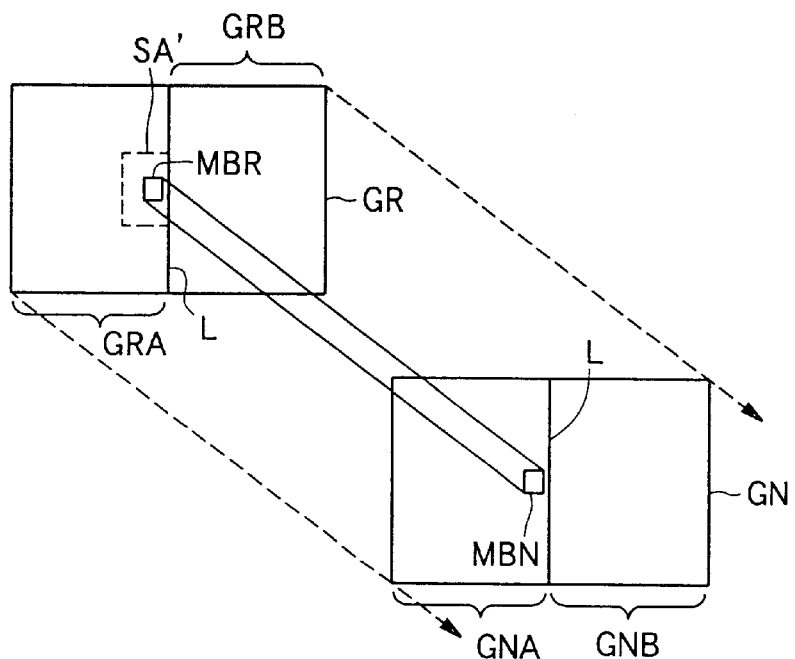
FIG. 4B is a diagram showing a first example (I) of the operation of the movement-prediction-compensation circuit for when the search area and boundary line overlap.

However, on the other hand, when the aforementioned boundary line L and search area SA' overlap, as shown in FIG. 4b, the width of the search area SA' is narrower than the area which includes the specified number of macro blocks MB in which the macro block MBR is the center, and that search area SA' is limited to the area that comes in contact with the boundary line L but does not cross over the boundary line L.

Next, FIG. 5a and FIG. 5b will be used to explain the method for setting the search area SA or SA' that is used by the motion-prediction-compensation circuit 36.

As shown in FIG. 5a, a table T is stored beforehand in the table memory 23 for setting the search area SA or SA' as shown in FIG. 4a and FIG. 4b.

This table T gives the relationship between the number of the macro block MBN to be predicted that is specified in the current frame image GN and the number of macro block MB in the previous image GR that is to be included in the search area SA or SA' that is set in the previous frame image GR. Here, the regular width of the search area SA is the width that includes a total of 25 macro blocks MB in 5 rows and 5 columns with the macro block MBR in the previous frame image as the center. The macro block MBR corresponds to the macro block MBN to be predicted.

Also, as shown in FIG. 5B, when the number of the macro block MBN to be predicted is "106", the search area SA becomes the search area SA shown in FIG. 5B. However, when the number of the macro block MBN to be predicted is "156", the search area SA' becomes the search area SA' shown in FIG. 5B. Here, since the macro block MBN to be predicted, whose number is "156", is near the boundary line L, the width of the search area SA' becomes narrower than the width of the search area SA.

When the control circuit 22 is instructed via the CPU 12 to simultaneously record the input data Sina and Sinb, the control circuit 22 reads the table T from the table memory 23 as a table signal Stm and sets the macro block MEN to be predicted based on the number of the macro block MB in the current frame image GN that is input as number data Sma. The control circuit 22 also sets the corresponding search area SA or SA' in the previous frame image GR and outputs a control signal Smc to the motion-prediction-compensation circuit 36 in order to detect motion.

The motion-prediction-compensation circuit 36 detects the motion vectors between the image GRA and image GRE, as shown in FIG. 4A and FIG. 4A, and executes the motion-prediction-compensation process using the motion vectors for all of the frame images that are input as macro block signals Smb. The motion-prediction-compensation circuit 36 also creates a compensation signal Se and outputs that signal to the subtracter 30 and adder 37.

In addition to the table T mentioned above., there is also a table stored in the table memory 23 that is used when compressing, coding and recording input data Sina from only one source. In this table, the search area is set as was done in the prior technology irrespective of the boundary line L in the table T. When the control circuit 22 compresses and codes input data Sina from only one source, it sets the search area using this table and outputs a control signal Smc to detect the motion vector and to execute the motion-prediction-compensation process.

Next, the variable-length coding circuit 25 to which the quantization signal Sq is input, performs variable-length coding of the quantization signal Sq in macro block MB units, and creates compressed image data Spd, which is a signal of the frame images that are contained in the original composite image data Scv and which is compressed and coded separately for the images that correspond to the input data Sina and images that correspond to the input data Sinb, and then outputs the data in the order of the number of macro block MB to the control circuit 22 and header-generator 26.

Then, according to a control signal Sh from the control circuit 22, the header generator 26 independently stores the picture element data contained in each of the macro blocks MB in the compressed image data Spd, which was input in order of the number of the macro block MB, for the picture element data that corresponds to the input data Sina and the picture element data that corresponds to the input data Sinb, and similarly independently adds various types of headers in MPEG format to the data.

At this time, according to the number of the macro block MB input as number data Sma, the control circuit 22 specifies for each macro block MB in the compressed image data Spd whether it is a macro block that contains the picture element data corresponding to the input data Sina, or whether it is a macro block that contains the picture element data corresponding to the input data Sinb, and generates a control signal Sh to store that specified picture element data independently in the header memory.

In more detail, as shown in FIG. 6, the picture element data that are contained in each of the macro blocks MB that are input as compressed image data Spd, are stored in the header memory 26a in the header generator 26, in the order that the data were input, and the various header necessary to configure a MPEG format data stream are stored in their corresponding areas.

As shown in FIG. 6, the types of headers are: sequence headers SCH, which are added to the start of a sequence; Group of Picture (GOP) headers GH, which are added to the start of a group of pictures; picture headers PH, which are added to the start of pictures in a frame image (in conventional MPEG format, this includes 1,320 macro blocks MB); slice headers SH, which are added to the start of each slice SL; and sequence end code SEC, which is added to the end of a sequence.

At this time, as shown in FIG. 6, image data DA that correspond to the input data Sina and image data DB that correspond to the input data Sinb are stored in separate areas of the header memory 26a in the order they were input, and furthermore, a header is added separately for each of the image data DA or image data DB. Also, in the header memory 26a, one picture comprises the picture element data corresponding to 660 macro blocks MB, and one slice SL comprises the picture element data corresponding 22 macro blocks MB.

Next, each of the picture element data stored in the header memory 26a is read from the header memory 26a as stream data Sst alternately for the image data DA and the image data DB, and then output to the switch 27.

Here, as shown in FIG. 7, the stream data Sst comprises a sequence (the portion of data from the sequence header SCH to the sequence end code SEC) of the image data DA and similarly a sequence of the image data DB that are separately and alternately linked in a continuous stream.

Furthermore, when the header generator 26 outputs the stream data Sst, it creates switch-timing data Scgg, which indicates the timing for switching between the image data DA and the image data DB in the stream data Sst, and outputs it to the control circuit 22.

Next, according to a control signal Scw4 that is output from the control circuit 22 based on the switch-timing data Scgg, the switch 27 switches so as to output the portion in the stream data Sst that corresponds to the image data DA to the output buffer 28a as stream data Ssta, and output the portion in the stream data Sst that corresponds to the image data DB to the output buffer 28b as stream data Sstb. At this time, the switch 27 switches to the output buffer 28a when the portion in the stream data Ssst that corresponds to the image data DA is input, and switches to the output buffer 28b when the portion in the stream data that corresponds to the image data DB is input.

The output buffers 28a and 28b temporarily and independently stores the stream data Ssta and Sstb, then create a storage-amount signal Sdd that indicates the amount stored in each output buffer and output that signal to the control circuit 22.

From the storage-amount signal Sdd, the control circuit 22 is aware of the amount stored in the output buffers, and creates the aforementioned rate signal Srr in order to control the processing rate for the quantization circuit 32.

Next, based on the processing rate in the switch-timing data Scgg and quantization circuit 32, the control circuit 22 creates a control signal Scw5 for controlling the timing for outputting the stream data Ssta or Sstb from the output buffers, and outputs that signal to the switch 29.

From this, the stream data Ssta and Sstb are output separately to the multiplexing circuit 11 as coded image data Sed with the timing given by the control signal Scw5.

At the same time as this, the control circuit 22 creates the timing signal St for synchronizing the timing between coded sound data Seaa or Seab and the coded image data Sed in the multiplexing circuit 11, and outputs that signal to the multiplexing circuit 11.

In the case where input data from only one source is coded in the image coding circuit 10, timing control is performed using only one of the output buffers 28a or 28b in the buffer unit 28.

Figure 8:
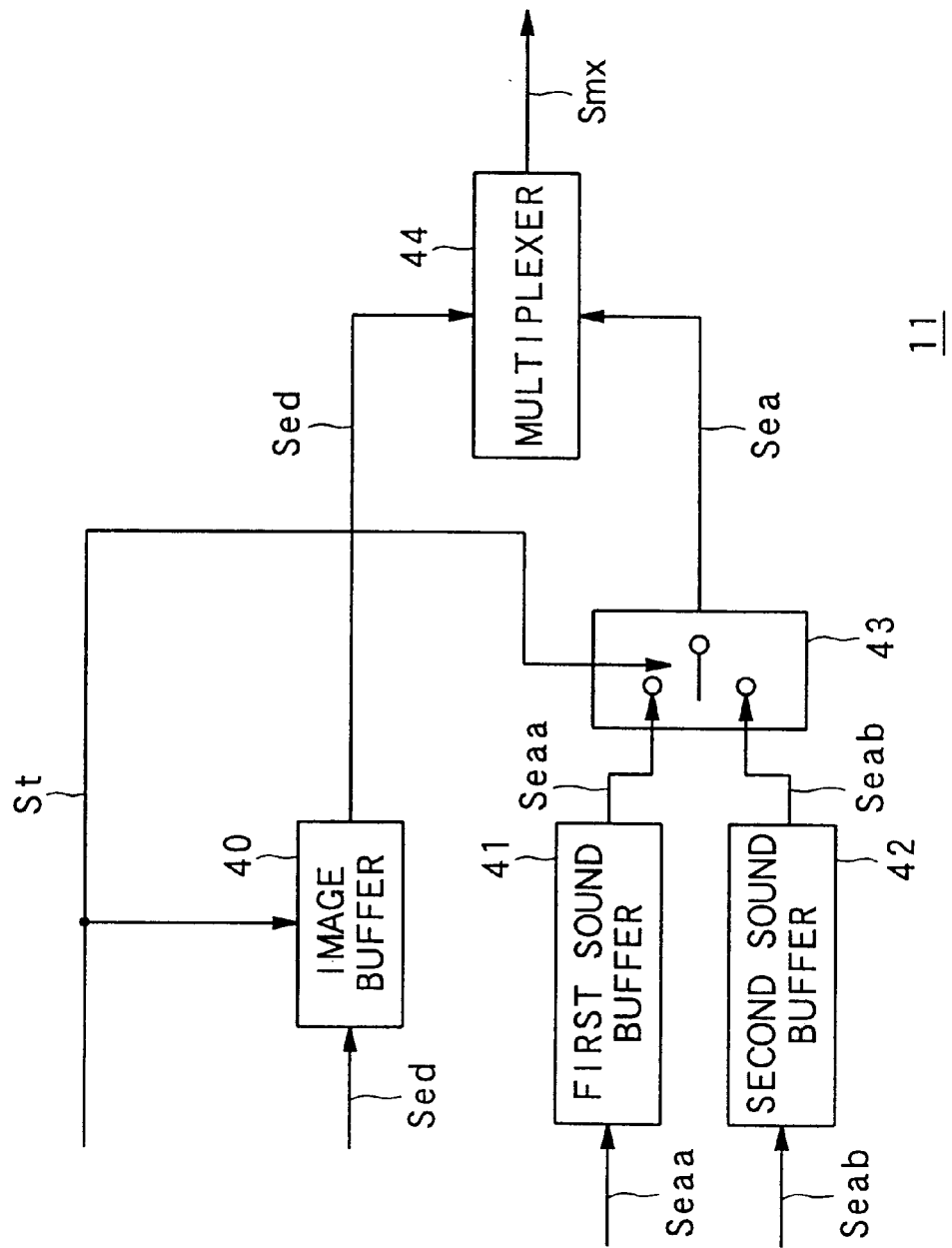
FIG. 8 is a block diagram showing the basic construction of a multiplexing circuit.

Next, FIG. 8 is used to explain the construction and operation of the multiplexing circuit 11.

First, as shown in FIG. 8, the multiplexing circuit 11 is comprised of an image buffer 40, a first sound buffer 41, a second sound buffer 42, a switch 43 and a multiplexer 44.

Next, the operation will be explained.

First, the image buffer 40 temporarily stores the coded image data Sed that is output from the image-coding circuit 10, and outputs the data to the multiplexer 44 with the timing given by the timing signal St.

At the same time, the first sound buffer 41 temporarily stores the coded sound data Seaa that is output from the sound-coding circuit 6, and outputs the data to one of the input terminals of the switch 43.

The second sound buffer 42 temporarily stores the coded sound data Seab that is output from the sound-coding circuit 7, and outputs the data to the other input terminal of the switch 43.

Then, based on the timing signal St, the switch 43 reads the coded sound data Seaa from the first sound buffer 41 at the timing that the image data DA shown in FIG. 7 is output to the multiplexer 44, and outputs that data to the multiplexer 44, and also reads the coded sound data Seab from the second sound buffer 42 at the timing that the image data DB shown in FIG. 7 is output to the multiplexer 44, and outputs that data to the multiplexer 44.

The multiplexer 44 performs multiplexing on the coded sound data Seaa, which contains sound data that corresponds to the image data DA, and creates multiplex data Smx and outputs it to the recording unit 13, and also performs multiplexing on the coded sound data Seab, which contains sound data that corresponds to the image data DB, and creates multiplex data Smx and outputs it to the recording unit 13.

Then, in the recording unit 13, the recording process described above is executed for each respective multiplex data Smx and recording data Sr is created.

At this time, the data that corresponds to the original input data Sina and the data that corresponds to the original input data Sinb are contained separately and independently in the recording data Sr (for example in separate file format), and these data are also recorded on the recording medium 14 in a form such that they can be handled separately and independently.

As explained above, with the image-coding circuit 10 of the data recording apparatus of this embodiment, the respective frame images of the image data Sva and Svb are collected as composite image data Scv, and the coding process is executed separately for each, so it is possible to code a plurality of moving images simultaneously with a single image-coding circuit 10.

Moreover, in the motion-prediction-compensation process, the search area SA or SA' is set and the motion vectors are detected only within the range of the images GVMA or GVMB (see FIG. 4A and FIG. 4B) so it is possible to code a plurality of moving images with the saint coding method as used for noncomposite moving images.

Moreover, in the motion-prediction-correction process, the search area SA or SA' is set and the motion vectors are detected only within the range of the images GVMA or GVMB (see FIG. 4A and FIG. 4B) so it is possible to code a plurality of moving images with the same coding method as used for non-composite moving images.

Furthermore, each process is executed based on the MPEG format so it is possible to compress and code a plurality of moving images simultaneously.

Also, sound data Saa or Sab is coded at the same time as coding of the moving images, and then combined, so it is possible to code and record input data Sina and Sinb from two sources simultaneously.

An embodiment in which the present invention is applied to a data recording apparatus R, which uses a coding format that complies with the MPEG format, was described above, however, the present invention may also be applied to any coding method that sets up a search area and detects the motion vectors.

Furthermore, it is also possible to apply the present invention to create composite image data from input data from three or more sources, and not just coding of input data from two sources.

In this case, the arrangement of image data that corresponds to all of the input data in the composite image data may be arranged in the vertical direction and not just the horizontal direction as in the case of the embodiment described above.

Furthermore, by recording a program that corresponds to the operation of the image-coding circuit 10, which includes the control circuit 22, on a recording medium such as a flexible disc or hard disc, it is possible for a personal computer or the CPU of a normal coding apparatus to read and execute the program and function as the image-coding circuit 10 of this embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-217979 filed on Jul. 18, 2000 including the specification, claims, drawings and summary is incorporated herein by reference in its entirety.

What is claimed is:

1. An image coding apparatus, which codes moving images by coding a composite frame image that is obtained by forming a boundary between frame images, each forming a plurality of different moving images, and by connecting the frame images, comprising:

a motion-prediction-compensation device for independently performing motion prediction compensation for each of said frame images in said composite frame image;

a quantization device for performing quantization for each of said frame images based on the results of said motion prediction compensation that is performed for each said frame image;

a coding device for coding said moving images by coding each said frame image based on the results of said quantization that is performed for each said frame image; and a control device for controlling said motion-prediction-compensation device, quantization device and coding device such that said motion prediction compensation, quantization and coding are performed for a plurality of continuous composite-frame images by said motion-prediction-compensation device, quantization device and coding device, respectively.

2. The image-coding apparatus according to claim 1, wherein said motion-prediction-compensation device executes said motion prediction compensation by detecting a motion vector, and detects the motion vector by setting a search area for said motion prediction compensation within only a range of said frame images contained in said composite frame image, and detecting the motion vector.

3. The image-coding apparatus according to claim 1, wherein said quantization device independently performs said quantization for each of said frame image in said composite frame image.

4. The image-coding apparatus according to claim 1, further comprising a discrete cosine transform device for performing discrete cosine transform of each said frame image based on the results of said motion prediction compensation that is performed on each said frame image, wherein said quantization device performs said quantization for each of said frame image of which discrete cosine transform is performed.

5. The image-coding apparatus according to claim 1, wherein said motion prediction compensation, quantization process and coding process are executed according to Moving Picture Experts Group (MPEG) format.

6. A data-coding apparatus, which includes an image-coding apparatus for coding moving images by coding a composite frame image that is obtained by foaming a boundary between frame images, each forming a plurality of different moving images, and by connecting the frame images, said image-coding apparatus comprising:

a motion-prediction-compensation device for independently performing motion prediction compensation for each of said frame images in said composite frame image;

a quantization device for performing quantization for each of said frame images based on the results of said motion prediction compensation that is performed for each said frame image;

a coding device for coding said moving images by coding each said frame image based on the results of said quantization that is performed for each said frame image; and a control device for controlling said motion-prediction-compensation device, quantization device and coding device such that said motion prediction compensation, quantization and coding are performed for a plurality of continuous composite-frame images by said motion-prediction-compensation device, quantization device and coding device, respectively, said data-coding apparatus comprising:

a separation device for separating moving images and sound data from a plurality of input data that contain said moving images and said sound data that correspond to said moving images;

a first composite-image device for reducing an amount of data in said frame images of said separated moving images by thinning out the data, and for generating said composite frame image to output that image to said image-coding apparatus;

a sound-coding device for coding said separated sound data simultaneously with coding of the corresponding said moving images and for generating coded sound data; and a second composite-image device for combining corresponding said coded moving images and said coded sound data and for generating a plurality of said coded input data.

7. A data-recording apparatus, which includes an image-coding apparatus for coding moving images by coding a composite frame image that is obtained by forming a boundary between frame images each forming a plurality of different moving images, and by connecting the frame images, said data-recording apparatus comprising:

a motion-prediction-compensation device for independently performing motion prediction compensation for each of said frame images in said composite frame image;

a quantization device for performing quantization for each of said frame images based on the results of said motion prediction compensation that is performed for each said frame image;

a coding device for coding said moving images by coding each said frame image based on the results of said quantization that is performed for each said frame image;

a control device for controlling said motion-prediction-compensation device, quantization device and coding device such that said motion prediction compensation quantization and coding are performed for a plurality of continuous composite-frame images by said motion-prediction-compensation device, quantization device and coding device, respectively;

a separation device for separating moving images and sound data from a plurality of input data that contain said moving images and said sound data that correspond to said moving images;

a first composite-image device for reducing an amount of data in said frame images of said separated moving images by thinning out the data, and for generating said composite frame image to output that image to said image-coding apparatus;

a sound-coding device for coding said separated sound data simultaneously with coding of the corresponding said moving images and for generating coded sound data;

a second composite-image device for combining corresponding said coded moving images and said coded sound data and for generating a plurality of said coded input data; and a recording device for separately recording said coded input data on a recording medium.

8. An image-coding method for coding moving images by coding a composite frame image tat is obtained by forming a boundary between frame images, each forming a plurality of different moving images, and by connecting the frame images, comprising the processes of:

independently performing motion prediction compensation for said frame images in said composite frame image;

performing quantization for each of said frame images based on the results of said motion-prediction-compensation that is performed for each of said frame images;

coding said moving images by coding each of said frame images based on the results of said quantization that is performed for each of said frame images; and repeating said motion prediction compensation, quantization and coding for a plurality of continuous said composite frame images.

9. The image-coding method according to claim 8, wherein said process of independently performing motion prediction compensation executes said motion-prediction-compensation by setting a search area for said motion-prediction-compensation within only the range of said frame images that are included in one said composite frame image and detecting the motion vectors.

10. The image-coding method according to claim 8, wherein said process of performing quantization independently performs quantization for each of said frame images in said composite frame image.

11. The image-coding method according to claim 8, further comprising the process of performing discrete cosine transform for each of said frame images based on the results of said movement-prediction-compensation that is performed for each of said frame images, and wherein said process for performing quantization executes quantization for each of said frame images after discrete cosine transformation.

12. The image-coding method according to claim 8, wherein said motion prediction compensation, quantization and coding are executed based on MPEG format.

13. A data-coding method that includes the image-coding method for coding said moving images by coding a composite frame image that is obtained by forming a boundary between frame images, each forming a plurality of different moving images, and by connecting the frame images said image-coding method comprising the processes of:

independently performing motion prediction compensation for said frame images in said composite frame image;

performing quantization for each of said frame images based on the results of said motion-prediction-compensation that is performed for each of said frame images;

and coding said moving images by coding each of said frame images based on the results of said quantization that is performed for each of said frame images;

and repeating said motion prediction compensation, quantization and coding for a plurality of continuous said composite frame images, said data-coding method comprising the processes of:

separating moving images and sound data from a plurality of input data that includes said moving images and corresponding sound data;

generating said composite-frame image to execute said image-coding method after reducing the amount of data in said frame images containing said separated moving images;

coding each of separated said sound data simultaneously with coding of corresponding said moving images to generate coded sound data; and combining corresponding said coded moving images and said coded sound data to generate a plurality of said coded input data.

14. A data-recording medium on which an image-coding program is recorded so that it is readable by a computer, which is included in an image-coding apparatus that codes said moving images by coding a composite-frame image that is obtained by forming a boundary between frame images, each forming a plurality of different moving images, and by connecting the frame images, said image-coding program causing the computer to function as:

a motion-prediction-compensation device for independently performing a motion prediction compensation for each of said frame images in said composite frame image;

a quantization device for performing quantization for each of said frame images based on the results of said motion prediction compensation that was performed for each said frame image;

a coding device for coding said moving images by coding each said frame image based on the results of said quantization that was performed for each said frame image; and a control device for controlling said motion-prediction-compensation device, quantization device and coding device such that said motion prediction compensation, quantization and coding are preformed for a plurality of continuous composite-frame images by said motion-prediction-compensation device, quantization device and coding device, respectively.

15. The data-recording medium according to claim 14, wherein said motion-prediction-compensation device performs said motion prediction compensation by setting the search area for the motion-prediction-compensation within only the range of said frame images that are included in one said composite-frame image and detecting the motion vectors.

16. The data-recording medium according to claim 14, wherein said quantization device performs quantization independently for each of said frame images in said composite-frame image.

17. The data-recording medium according to claim 14, said image-coding program further causing the computer to function as:
   a discrete cosine transform device for performing discrete cosine transformation of each of said frame images based on the results of said motion-prediction-compensation that is performed for each of said frame images, wherein said quantization device performs quantization for each of said frame images after discrete cosine transformation.

18. The data-recording medium according to claim 14, wherein said motion-prediction-compensation, quantization and coding are executed based on MPEG format.

19. A data-recording medium on which a coding program is recorded so that it is readable by a computer, which is included in a data-coding apparatus that includes an image-coding apparatus that codes said moving images by coding a composite-frame image that is obtained by forming a boundary between frame images each forming a plurality of different moving images, and by connecting the frame images, said coding program that includes an image-coding program causing the computer to function as said image-coding apparatus comprising
   a motion-prediction-compensation device for independently performing a motion prediction compensation for each of said frame images in said composite frame image;
   a quantization device for performing quantization for each of said frame images based on the results of said motion prediction compensation that was performed for each said frame image;
   a coding device for coding said moving images by coding each said frame image based on the results of said quantization that was performed for each said frame image; and
   a control device for controlling said motion-prediction-compensation device, quantization device and coding device such that said motion prediction compensation, quantization and coding are performed for a plurality of continuous composite-frame images by said motion-prediction-compensation device, quantization device and coding device, respectively, wherein said coding program further causing the computer to function as:
   a separation device for separating moving images and sound data from a plurality of input data that includes said moving images and corresponding sound data;
   a first composite-image device for reducing the amount of data in said frame images containing said separated moving images, and for generating said composite-frame image to output tat image to said computer functioning as said image-coding apparatus;
   a sound-coding device for coding each of separated said sound data simultaneously with coding of corresponding said moving images, and for generating coded sound data; and
   a second composite-image device for combining corresponding said coded moving images and said coded sound data, and for generating a plurality of said coded input data.

\* \* \* \* \*